US012755332B2

(12) United States Patent
Cheng et al.

(10) Patent No.: US 12,755,332 B2
(45) Date of Patent: Oct. 6, 2026

(54) IMAGE PROCESSING METHOD FOR IMAGE EXPANSION AND APPARATUS, AND STORAGE MEDIUM AND DEVICE

(71) Applicant: BEIJING BYTEDANCE NETWORK TECHNOLOGY CO., LTD., Beijing (CN)

(72) Inventors: Jing Cheng, Beijing (CN); Shaohui Jiao, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 490 days.

(21) Appl. No.: 18/548,786

(22) PCT Filed: Mar. 4, 2022

(86) PCT No.: PCT/CN2022/079383
§ 371 (c)(1),
(2) Date: Sep. 1, 2023

(87) PCT Pub. No.: WO2022/199364
PCT Pub. Date: Sep. 29, 2022

(65) Prior Publication Data

US 2024/0169476 A1 May 23, 2024

(30) Foreign Application Priority Data

Mar. 24, 2021 (CN) ......................... 202110312618.1

(51) Int. Cl.
*G06T 3/403* (2024.01)
*G06T 3/10* (2024.01)
(Continued)

(52) U.S. Cl.
CPC ................ *G06T 3/10* (2024.01); *G06T 3/403* (2013.01); *G06T 3/4046* (2013.01); *G06T 7/13* (2017.01);
(Continued)

(58) Field of Classification Search
None
See application file for complete search history.

(56) References Cited

U.S. PATENT DOCUMENTS 5,440,350 A * 8/1995 Golin ..................... H04N 19/51
375/E7.263
11,435,460 B2 * 9/2022 Dhatt ..................... G16H 50/20
(Continued)

FOREIGN PATENT DOCUMENTS

CN 108491847 A 9/2018
CN 111047508 A 4/2020
(Continued)

OTHER PUBLICATIONS

International Search Report (with English translation) and Written Opinion issued in PCT/CN2022/079383, dated May 17, 2022, 10 pages provided.

(Continued)

*Primary Examiner* — Joni Hsu
(74) *Attorney, Agent, or Firm* — Astute IP Law Group

(57) ABSTRACT

Provided are an image processing method and apparatus, a storage medium, and a device. The method includes acquiring edge image information in an expansion direction of an original image, selecting a target expansion mode from at least two candidate expansion modes according to the edge image information, and processing the original image by using the target expansion mode to obtain a target image.

11 Claims, 7 Drawing Sheets

(51) Int. Cl.
*G06T 3/4046* (2024.01)
*G06T 7/13* (2017.01)

(52) U.S. Cl.
CPC ............... *G06T 2207/20081* (2013.01); *G06T 2207/20084* (2013.01)

(56) References Cited

U.S. PATENT DOCUMENTS

| | | | | |
|---|---|---|---|---|
| 2005/0190202 | A1* | 9/2005 | Suzuki | H04N 7/0122 348/E5.111 |
| 2010/0165088 | A1* | 7/2010 | Seo | A61B 1/0005 348/E7.085 |
| 2019/0007702 | A1* | 1/2019 | Wang | H04N 19/55 |
| 2021/0097646 | A1* | 4/2021 | Choi | G06N 3/08 |
| 2021/0279841 | A1* | 9/2021 | Liu | G06T 3/4038 |
| 2022/0156886 | A1* | 5/2022 | Petrangeli | G06N 3/0464 |
| 2024/0208419 | A1* | 6/2024 | Chang | G06T 19/006 |

FOREIGN PATENT DOCUMENTS

| | | | | | |
|---|---|---|---|---|---|
| CN | 111598091 | A | | 8/2020 | |
| CN | 111598779 | A | | 8/2020 | |
| CN | 112215854 | A1 | | 1/2021 | |
| CN | 113034348 | A | | 6/2021 | |
| JP | 2008005352 | A | | 1/2008 | |
| JP | 2008204035 | A | * | 9/2008 | |
| WO | 202024508 | A1 | | 12/2020 | |
| WO | WO-2020242508 | A1 | * | 12/2020 | G06N 3/047 |

OTHER PUBLICATIONS

Chinese Search Report issued in corresponding Chinese Application No. 202110312618.1, dated Sep. 25, 2023, with English machine translation, 5 pages provided.
Office Action issued in corresponding Chinese Application No. 202110312618.1, dated Oct. 31, 2023, with English machine translation, 17 pages provided.

* cited by examiner

IMAGE PROCESSING METHOD FOR IMAGE EXPANSION AND APPARATUS, AND STORAGE MEDIUM AND DEVICE

CROSS-REFERENCE TO RELATED APPLICATIONS

This is a National Stage Application filed under 35 U.S.C. 371 based on International Patent Application No. PCT/CN2022/079383, filed on Mar. 4, 2022, which claims priority to Chinese Patent Application No. 202110312618.1 filed on Mar. 24, 2021, the disclosures of both of which are incorporated herein by reference in their entireties.

TECHNICAL FIELD

Embodiments of the present disclosure relate to the field of image processing technology, for example, an image processing method and apparatus, a storage medium, and a device.

BACKGROUND

An image may contain rich content and information and serves as a common information carrier. Images come from a wide range of sources. For example, an image may be shot through an image collection apparatus or may be drawn through drawing software. The usage scenarios of the images are also diversified. After the images are generated, adjustments are usually needed in some usage scenarios to meet the individual needs of the current usage scenarios, for example, the need of adapting to layout requirements or matching the size of a display region.

At present, the common adjustment modes include, for example, cutting and zooming. However, the mode of cutting often makes part of the information of an image lost, and an image obtained through the mode of zooming often has a distorted deformation. In order to solve problems caused by the preceding conventional adjustment modes, a solution of an expansion on the basis of an original image occur. For example, an image with a greater size may be obtained through a mode in which an expansion region is added on an outer side of the original image and in which solid-color fill or gradient fill is performed on the expansion region. However, the effect of the expansion image obtained through the expansion solution in the related art is still not ideal, and the expansion solution needs to be improved.

SUMMARY

Embodiments of the present disclosure provide an image processing method and apparatus, a storage medium, and a device so that image expansion processing solutions in the related art can be improved.

In a first aspect, an embodiment of the present disclosure provides an image processing method.

Edge image information in an expansion direction of an original image is acquired.

A target expansion mode is selected from at least two candidate expansion modes according to the edge image information.

The original image is processed by using the target expansion mode to obtain a target image.

In a second aspect, an embodiment of the present disclosure provides an image processing apparatus. The apparatus includes an edge image information acquisition module, an expansion mode selection module, and an image expansion processing module.

The edge image information acquisition module is configured to acquire edge image information in an expansion direction of an original image.

The expansion mode selection module is configured to select a target expansion mode from at least two candidate expansion modes according to the edge image information.

The image expansion processing module is configured to process the original image by using the target expansion mode to obtain a target image.

In a third aspect, an embodiment of the present disclosure provides a computer-readable storage medium for storing a computer program. When the computer program is executed by a processor, the image processing method according to embodiments of the present disclosure is performed.

In a fourth aspect, an embodiment of the present disclosure provides a computer device. The computer device includes a memory, a processor, and a computer program stored in the memory and executable by the processor. When executing the computer program, the processor performs the image processing method according to embodiments of the present disclosure.

DETAILED DESCRIPTION

Figure 1:
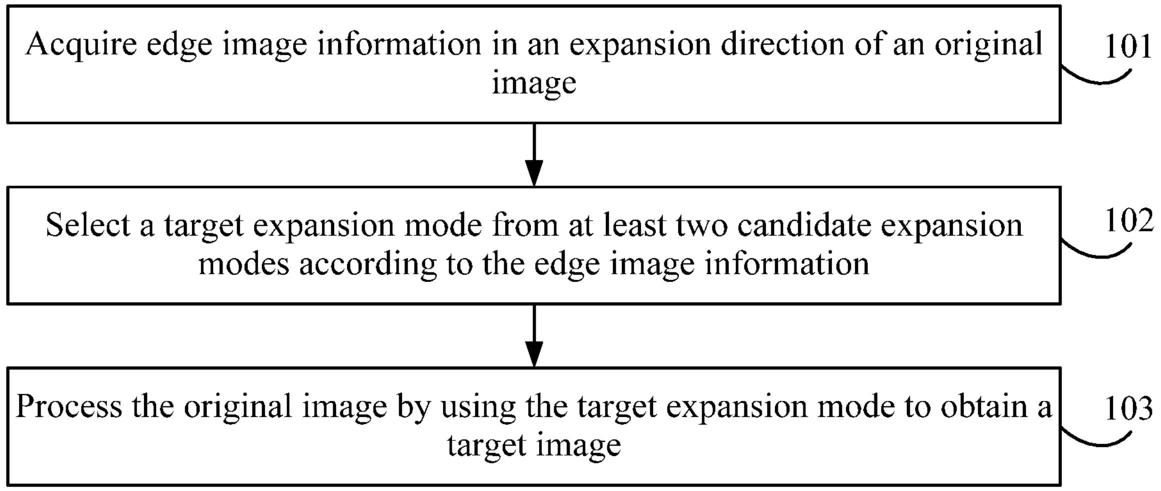
FIG. 1 is a flowchart of an image processing method according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that drawings and embodiments of the present disclosure are merely illustrative and are not intended to limit the scope of the present disclosure.

It is to be understood that the various steps recorded in the method embodiments of the present disclosure may be performed in a different order, and/or in parallel. Additionally, the method embodiments may include an additional step and/or omit performing an illustrated step. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" mentioned in the present disclosure are intended to be illustrative and not limiting; those skilled in the art should understand that "one" or "a plurality" should be understood as "one or more" unless clearly expressed in the context.

The names of messages or information exchanged between apparatuses in embodiments of the present disclosure are illustrative and not to limit the scope of the messages or information.

Example features and examples are provided in each of the multiple embodiments described below. Multiple features described in the embodiments can be combined to form multiple example solutions. Each numbered embodiment should not be regarded as only one solution.

FIG. 1 is a flowchart of an image processing method according to an embodiment of the present disclosure. The method may be performed by an image processing apparatus. The apparatus may be implemented by software and/or hardware and is generally integrated in an electronic device. Specific scenes to which this embodiment of the present disclosure is applicable are not limited and may be offline image editing scenes or online image editing scenes. For example, an already generated image may be expanded to adapt to the current scene, for example, adapting to layout requirements or matching the size of a display region. As shown in FIG. 1, the method includes the steps below.

In step 101, edge image information in an expansion direction of an original image is acquired.

An expansion in this embodiment of the present disclosure may be understood as enlarging an image size by augmenting image content rather than enlarging the image size by keeping the content of the original image unchanged through an amplification operation or the like. The original image may be understood as an image that needs to be expanded during expansion processing. This embodiment of the present disclosure does not limit the source of the original image. For example, the original image may be an image shot through an image collection apparatus such as a camera, an image drawn through drawing software, an image stored locally in a device, or an image acquired through a network. The original image may also be an image on which expansion processing has been performed once or multiple times.

Figure 2:
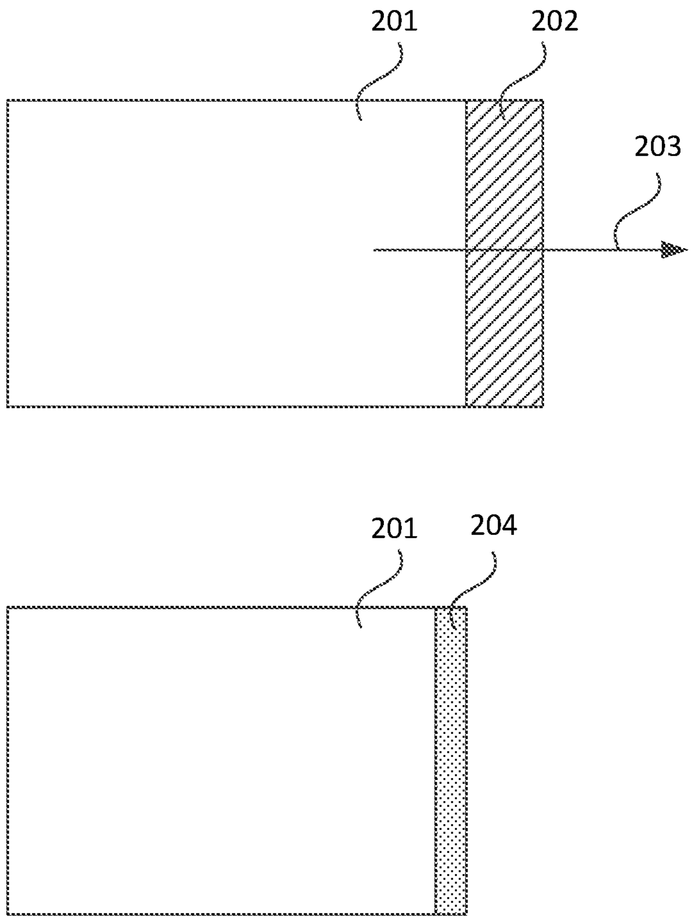
FIG. 2 is a diagram illustrating an image expansion according to an embodiment of the present disclosure.

The shape of the original image is not limited. The original image is generally polygonal. Of course, the original image may also be round or of other irregular shapes. The expansion direction may be determined according to current expansion requirements. A region where the image content added on the basis of the original image is located may be referred to as an expansion region. The expansion direction is determined according to the relative position relationship between the expansion region and the original image. For ease of description, a relatively common rectangular image is taken for example hereinafter. The rectangle has four boundaries. Each boundary may have a corresponding expansion region. FIG. 2 is a diagram illustrating an image expansion according to an embodiment of the present disclosure. As shown in FIG. 2, the right boundary of the original image 201 has a corresponding expansion region 202. The left boundary of the expansion region 202 coincides with the right boundary of the original image 201. A direction which is perpendicular to the right boundary of the original image 201 and points to the outside of the original image 201 is an expansion direction 203 corresponding to the expansion region 202, which may also be understood as a horizontal expansion to the right on the basis of the original image 201. The image content in the expansion region 202 is newly-added image content. The newly-added image content may be related to the image content in the original image 201 but is generally not completely the same as the image content in the original image 201.

Illustratively, the edge image information may include the image information of an edge region, of the original image, corresponding to the expansion direction. The image information may include, for example, pixel values, brightness, or image content, which is not specifically limited. The edge region may be determined according to the position of a junction of the original image and the expansion region, for example, an image region close to a boundary of the original image. The specific size of the edge region is not limited and may be determined according to the shape and size of the original image and the current expansion requirements. Referring to FIG. 2, when the original image 201 is rectangular, the edge region 204 may be a rectangle that has the same height as the original image 201, a smaller width than the original image 201, and a right boundary coincident with the right boundary of the original image 201.

In step 102, a target expansion mode is selected from at least two candidate expansion modes according to the edge image information.

In this embodiment of the present disclosure, multiple candidate expansion modes may be preset. The specific content of the candidate expansion modes is not limited and may be set according to actual requirements during a specific implementation. The candidate expansion modes may include, for example, filling the expansion region with a preset image, filling the expansion region with a solid color, applying gradient fill to the expansion region, copying edge pixels of the original image into the expansion region, inputting all or part of the original image into a neural network model to obtain an expansion image, or any combination of the preceding modes.

Illustratively, the target expansion mode is selected from the at least two candidate expansion modes according to the edge image information. One or more target expansion modes may be provided, which is not specifically limited. The edge image information may reflect the image situation at the junction of the original image and the expansion region, such as the complexity, the brightness degree and the expansion difficulty of the image content of the edge region. Therefore, the target expansion mode may be selected more pertinently according to the edge image information. The specific selection basis may be set according to the actual situation.

In step 103, the original image is processed by using the target expansion mode to obtain a target image.

Illustratively, after the target expansion mode is selected reasonably and pertinently according to the edge image information, the original image is processed by using the target expansion mode so that the obtained target image has a better expansion effect. The specific processing process may be determined according to the selected target expansion mode, which is not further described here.

For the image processing method according to this embodiment of the present disclosure, the edge image information in the expansion direction of the original image is acquired; the target expansion mode is selected from the at least two candidate expansion modes according to the edge image information; and the original image is processed by using the target expansion mode to obtain the target image. Through the preceding technical solution, for the original image to be expanded, a more suitable expansion mode may be selected flexibly according to the edge image information in the expansion direction. Compared with the rigid adoption of a single expansion mode, more pertinent expansion processing can be implemented, and the expanded target image with a better expansion effect can be obtained.

In some embodiments, the at least two candidate expansion modes include a first mode and a second mode. The first mode is implemented by copying edge pixels. The second mode is implemented based on a neural network model. The step in which the target expansion mode is selected from the at least two candidate expansion modes according to the edge image information includes the following steps: A complexity of the image content of an edge region is determined according to the edge image information; in response to determining that the complexity is less than or equal to a first preset complexity, the first mode is determined as the target expansion mode; and in response to determining that the complexity is greater than a second preset complexity, the second mode is determined as the target expansion mode. The second preset complexity is greater than or equal to the first preset complexity. With this arrangement, the candidate expansion modes can be set more reasonably, and the suitable target expansion mode can be selected more reasonably regarding the current original image. It is to be noted that in addition to the preceding first mode and second mode, the at least two candidate expansion modes may also include another mode such as a third mode. When the second preset complexity is greater than the first preset complexity, another mode such as the third mode may be used as the target expansion mode if the complexity of the image content of the edge region is between the first preset complexity and the second preset complexity. For ease of description, an example in which the at least two candidate expansion modes include the first mode and the second mode and in which the second preset complexity is greater than the first preset complexity is adopted for subsequent description. The first preset complexity and the second preset complexity are collectively referred to as a preset complexity.

Figure 3:
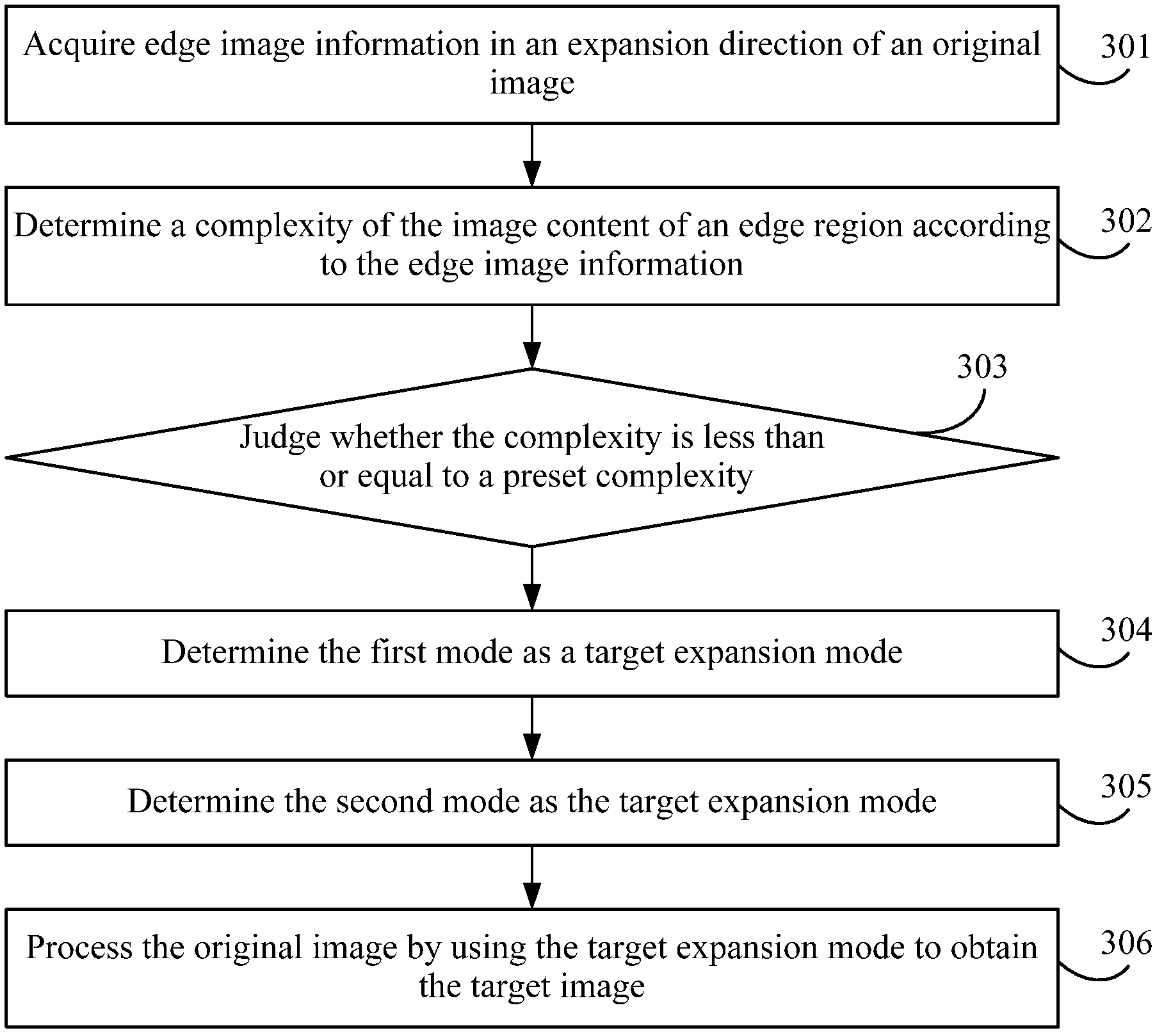
FIG. 3 is a flowchart of an image processing method according to an embodiment of the present disclosure.

FIG. 3 is a flowchart of an image processing method according to an embodiment of the present disclosure. Refinement is performed on the basis of multiple preceding example embodiments. As shown in FIG. 3, the method may include the steps below.

In step 301, edge image information in an expansion direction of an original image is acquired.

In step 302, a complexity of the image content of an edge region is determined according to the edge image information.

Illustratively, the complexity may be measured by using a first indicator and a second indicator. The first indicator includes a mean square error of pixel values of the edge region. The greater the mean square error, the greater the corresponding complexity. The second indicator includes a grayscale value of the edge region. The greater the grayscale value, the less the corresponding complexity. This arrangement enables the complexity to be quantified more reasonably, thereby determining the target processing mode more accurately.

Illustratively, when the pixel values are represented by multiple channels, the mean square error of the pixel values may include the mean square error (MSE) of the numerical value of each channel. Taking the RGB format for example, R, G, and B denote red, green, and blue respectively. The mean square error of the pixel values may be represented as the mean square error of the numerical value of each of the three channels, which, for example, may be denoted as r_mse, g_mse, and b_mse. r denotes the numerical value of the red channel. g denotes the numerical value of the green channel. b denotes the numerical value of the blue channel. Additionally, the mean square error of the pixel values may also be calculated according to the mean square error of each channel. The calculation mode is, for example, averaging, which is not specifically limited.

Illustratively, the grayscale value of the edge region may be understood as a light-color indicator and may be denoted as grey_lev. The specific calculation mode may be set according to the actual situation. Taking the RGB format for example, the calculation mode may be that grey_lev=r*0.299+g*0.587+b*0.114. r denotes the numerical value of the red channel. g denotes the numerical value of the green channel. b denotes the numerical value of the blue channel. The numerical value of each channel may be an average value corresponding to all pixel points. In this case, the obtained grayscale value may be directly taken as the grayscale value of the edge region. Alternatively, a corresponding grayscale value may be calculated according to each single pixel point. Then the grayscale values of all pixels are further calculated (for example, averaged) to obtain the grayscale value of the edge region.

In step 303, it is judged whether the complexity is less than or equal to a preset complexity. Based on a judgment result that the complexity is less than or equal to the preset complexity, step 304 is performed. Based on a judgment result that the complexity is greater than the preset complexity, step 305 is performed.

Illustratively, the representation of the preset complexity may be the same as the representation of the complexity. A threshold corresponding to each indicator may be set, thereby judging the complexity. For example, a threshold corresponding to the first indicator is a first preset complexity threshold, and a threshold corresponding to the second indicator is a second preset complexity threshold. When the first indicator is less than or equal to the first preset complexity threshold (when the mean square error corresponding to each channel is less than or equal to the first preset complexity threshold in the case of multiple channels) or when the second indicator is greater than or equal to the second preset complexity threshold, it may be determined that the complexity is less than or equal to the preset complexity. For example, the first preset complexity threshold is 40, and the second preset complexity threshold is 192. Then when the mean square error corresponding to each of the R, G and B channels is less than or equal to 40 or when the grayscale value of the edge region is greater than or equal to 192, it may be determined that the complexity is less than or equal to the preset complexity. For example, it may be represented as that r_mse≤40, that g_mse≤40, and that b_mse≤40; alternatively, grey_lev≥192.

In step 304, the first mode is determined as the target expansion mode.

The first mode is implemented by copying edge pixels. The edge pixels may include all or part of pixels in the edge region. When the image content is relatively simple, the first mode is adopted to quickly generate a target image with a relatively ideal effect.

In step 305, the second mode is determined as the target expansion mode.

The second mode is implemented based on a neural network model. The neural network model has strong learning and generation ability regarding image information and is more suitable for expanding complex image content. This embodiment of the present disclosure does not limit the specific type or structure of the neural network model. For example, the second mode may be implemented based on Generative Adversarial Networks (GAN), a Variational Auto-Encoder (VAE), a Transformer model, or a patch match. The inventor finds through plenty of research that for the neural network model, the effect of the finally-generated target image is not ideal when the image content is too simple. This is because plenty of additional image noise information is usually generated.

In step 306, the original image is processed by using the target expansion mode to obtain the target image.

Illustratively, when the target expansion mode is the first mode, the edge pixels may be copied and filled into an expansion region. For example, the expansion direction is rightward horizontally. Pixels in the rightmost edge column may be copied. Then for each pixel, one row is filled horizontally. That is, each row of pixels in the expansion region have the same pixel value which is equal to the pixel value of a pixel on a boundary of the original image closest to the row. With such processing, it is visually sensed that stretching is performed on the original image. This processing may also be referred to as a stretching processing mode. Additionally, after the expansion region is filled through the copying mode, operations such as Gaussian filtering may also be performed for the entire expansion region, making the transition from the original image to the expansion region more natural. With such processing, it is visually sensed that stretching and gradient processing are performed on the original image. This processing may also be referred to as a gradient stretching processing mode.

Illustratively, when the target expansion mode is the second mode, the original image or part of the original image may be input into a target image generation network to obtain the target image or obtain a generated image including the image content of the expansion region. On the basis of the generation image, an expansion image may be intercepted and spliced with the original image to obtain the target image.

For the image processing method according to this embodiment of the present disclosure, the complexity of the image content of the edge region is judged. Then the suitable target expansion mode is selected. The first mode implemented by copying the edge pixels and the second node implemented based on the neural network model are combined. The advantages of each of the two processing modes are made the most of so that original images with different edge image complexities can each have a relatively sound expansion effect.

In some embodiment, the step in which in response to determining that the target expansion mode includes the second mode, the original image is processed by using the target expansion mode includes the following steps: An original sub-image is intercepted from the original image according to an expansion length corresponding to the expansion direction; a mask image is generated according to the original sub-image, where the size of the mask image is greater than the size of the original sub-image; the original sub-image and the mask image are input into the target image generation network to obtain the generation image output by the target image generation network; and the expansion image is intercepted from the generation image, and the target image is generated according to the original image and the expansion image. With this arrangement, part of the original image can be selected more pertinently to serve as the input of the model, thereby obtaining a more accurate expansion result. It is to be noted that the intercepted original sub-image may be part of the original image. Alternatively, the intercepted original sub-image may be may be the original image, that is, the original sub-image coincides with the original image.

Figure 4:
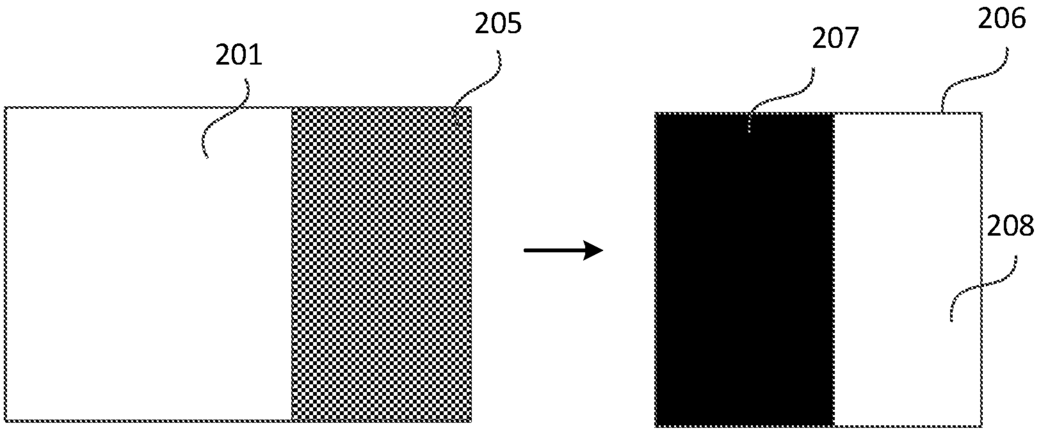
FIG. 4 is a diagram illustrating a mask image generation process according to an embodiment of the present disclosure.

Illustratively, the expansion length may be set according to actual expansion requirements. As shown in FIG. 2, the expansion length corresponding to the expansion direction 203 may be the width of the expansion region 202, that is, the length of the upper boundary of the expansion region 202 and the length of the lower boundary of the expansion region 202. When the original sub-image is intercepted, the size of the original sub-image in the expansion length direction may be determined according to the product of the expansion length and a first preset ratio value. The first preset ratio value may be set freely, for example, 2.5. FIG. 4 is a diagram illustrating a mask image generation process according to an embodiment of the present disclosure. As shown in FIG. 4, the original sub-image 205 is intercepted from the original image 201. The size of the mask image may be set according to the characteristics of the model. Generally, a square mask image is more friendly to the neural network model. The size of the mask image may be set to a square. In this case, the side length of the mask image may be equal to the side length of a long side of the original sub-image. As shown in FIG. 4, the mask image 206 is square. The side length of the mask image 206 is equal to the side length of a long side of the original sub-image 205, that is, the height of the original image 201. A black region 207 in the mask image 206 is the part corresponding to the original sub-image 205 and may also be referred to as a black range or an original-image range. A white region 208 in the mask image 206 is the part corresponding to the expansion region and may also be referred to as a white range or an expansion range.

After the generation image is output by the target image generation network, the expansion image may be intercepted as needed. The size of the expansion image may be the same as or greater than the size of the expansion region. If the size of the expansion image is greater than the size of the expansion region, the expansion image and the original image may form an overlapping region, contributing more to subsequent fusion processing. The forming of the overlapping region lies in that the boundary length of the expansion image in the expanding expansion is greater than the length to be expanded. Therefore, in order to make the size of the target image match an expected size, the expansion image needs to overlap a partial region of the original image, thereby forming the overlapping region.

Illustratively, the step in which the target image is generated according to the original image and the expansion image may be splicing or fusing the original image with the expansion image so that the obtained expansion image meets the current size expectation.

In some embodiments, the target image generation network is obtained by training a preset network model. The preset network model is implemented based on Generative Adversarial Networks. The Generative Adversarial Networks have strong learning and generation ability regarding image information and may achieve a better effect for the expansion of a complex image. In the process of training the preset network model, multiple training stages may be divided into. That is, the training process of the preset network model involves a plurality of training stages. Types of loss functions corresponding to each training stage increase sequentially from a first training stage to a last training stage, thereby training the model more efficiently.

Illustratively, the first training stage includes a reconstruction loss function. A second training stage includes the reconstruction loss function, an adversarial loss function, and a perceptual loss function. A third training stage includes the reconstruction loss function, the adversarial loss function, the perceptual loss function, and a structure similarity loss function. In the first training stage, that is, the initial stage, only the reconstruction loss function is provided so that the model can converge quickly and learn some coarse-grained information. In the second training stage, that is, the middle stage, the adversarial loss function (adv_loss) and the perceptual loss function are added to optimize details of the generated part. In the third training stage, the structure similarity (SIM) loss function is added to improve the brightness and contrast of the generated effect.

In some embodiments, in the process of training the preset network model, training samples may be derived from an open-source image library or images collected according to actual requirements. In order to improve the robustness of the expansion, that is, an unfixed ratio of the expansion, the ratio of the white range, of the mask image, in the mask image may be set randomly for the training samples (for example, the ratio may be between 0.1 and 0.45).

In some embodiments, before the original sub-image and the mask image are input into the target image generation network, the method further includes performing image style recognition on the original image to obtain a target image style and querying preset correspondences according to the target image style to obtain the target image generation network. The preset correspondences include correspondences between different image styles and image generation networks. For images with different styles, image generation networks with corresponding styles may be trained and obtained separately, making the generation image output by the target image generation network more consistent with the style characteristics of the original image. The classification mode of image styles is not limited. For example, the image styles may include a natural scenery type, a freehand style type, a cartoon type, a figure type, and a building type. For example, the image style recognition performed on the original image may be completed by using an image style classification model. The image style classification model may be, for example, a convolutional neural network (CNN) image classification model.

In some embodiments, if multiple image generation networks need to be provided according to the image styles, training samples at the initial stage and at the middle stage may not be classified temporarily to improve the training efficiency. Later corresponding classification training samples are selected according to image style types to train an intermediate image generation network completed through the training at the middle stage so as to obtain image generation networks corresponding to each image style.

In some embodiments, the step in which the target image is generated according to the original image and the expansion image includes performing pixel weighted splicing on the original image and the expansion image to generate the target image. The overlapping region of the original image and the expansion image includes a plurality of pixel positions. The weight magnitude of a first pixel corresponding to each pixel position is negatively correlated with the distance of each pixel position relative to the original image. The weight magnitude of a second pixel corresponding to each pixel position is positively correlated with the distance of each pixel position relative to the original image. The first pixel is derived from the original image. The second pixel is derived from the expansion image. That is, gradient fusion is performed on the expansion image and the original image. Pixel weights are mixed at joints of the original image and the expansion image. For the part closer to the original image, the pixel weight of the original image is higher. For the part closer to the expansion image, the weight of the expansion image is higher. Therefore, the gradient fusion is completed. With this arrangement, the transition from the original image to the expansion region is more natural, further improving the image quality and effect of the target image.

Figure 5:
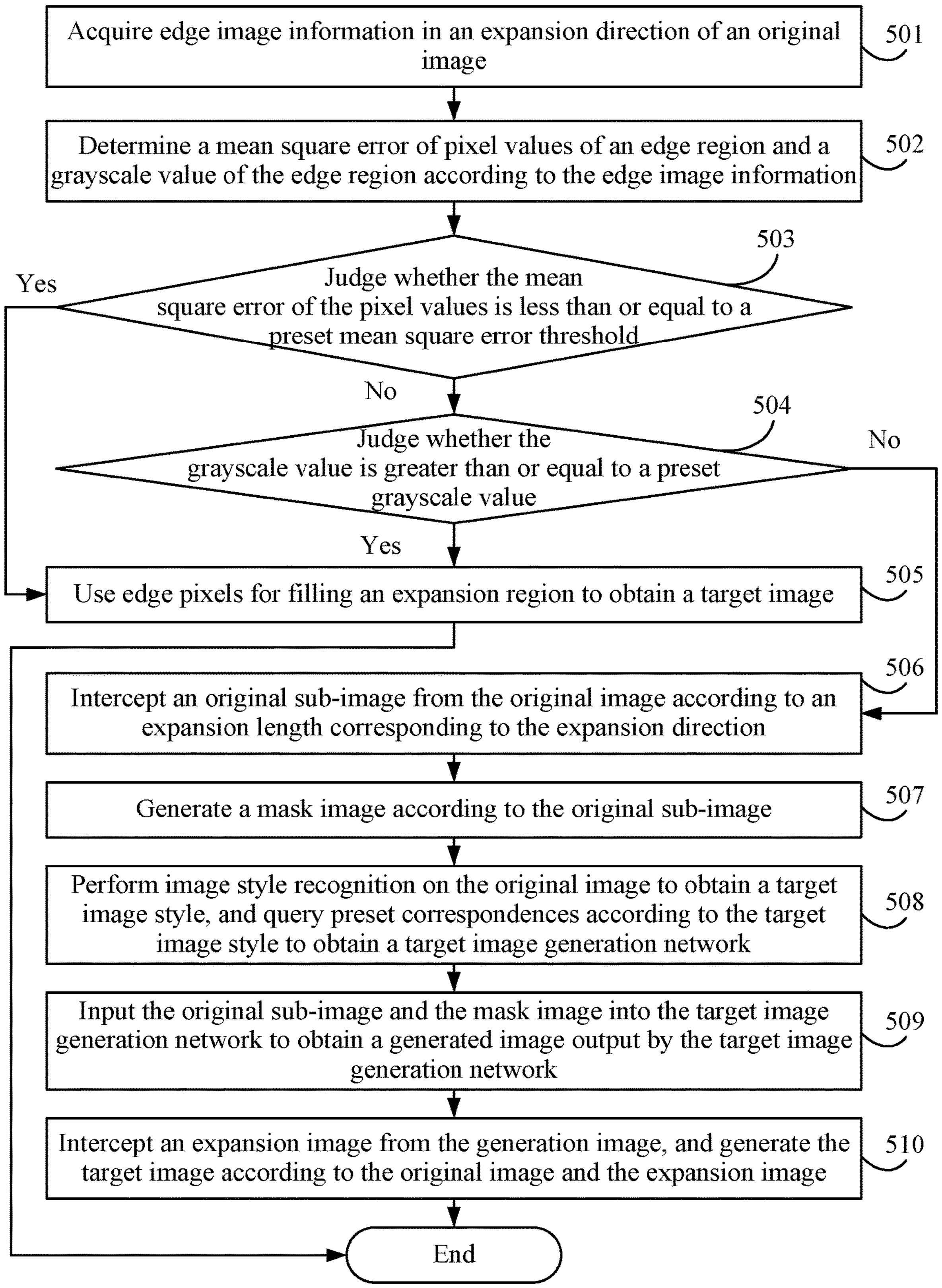
FIG. 5 is a flowchart of an image processing method according to an embodiment of the present disclosure.

FIG. 5 is a flowchart of an image processing method according to an embodiment of the present disclosure. Refinement is performed on the basis of multiple preceding example embodiments.

As shown in FIG. 5, the method may include the steps below.

In step 501, edge image information in an expansion direction of an original image is acquired.

Illustratively, before this step, the original image and the expansion target information corresponding to the original image may be acquired first. The expansion target information may include, for example, the expansion direction and the size and position of an expansion region. The expansion target information may be set automatically according to the requirements of the current scene by a computer device or may be set according to the received user input information. When the size of the expansion region is relatively great, for example, when the size of the expansion region is much greater than the size of the original image, the expansion effect may be poor. In this case, for example, a prompt message or an error message may be returned.

Illustratively, for a rectangular original image, it may be judged first whether the length of a boundary parallel to the expansion direction is greater than or equal to the length of a boundary perpendicular to the expansion direction. Based on a judgment result that the length of the boundary parallel to the expansion direction is greater than or equal to the length of the boundary perpendicular to the expansion direction, the subsequent process is allowed to be entered. Based on a judgment result that the length of the boundary parallel to the expansion direction is less than the length of the boundary perpendicular to the expansion direction, it may be further judged whether the length of the boundary parallel to the expansion direction is greater than or equal to a second preset ratio value (less than 1, for example, 0.6) of the length of the boundary perpendicular to the expansion direction. Based on a judgment result that the length of the boundary parallel to the expansion direction is greater than or equal to the second preset ratio value of the length of the boundary perpendicular to the expansion direction, the subsequent process is allowed to be entered. Based on a judgment result that the length of the boundary parallel to the expansion direction is less than the second preset ratio value of the length of the boundary perpendicular to the expansion direction, a processing failure message may be returned and the process is ended.

Illustratively, the edge image information may be pixel values of each pixel in an edge region of a preset pixel width. For example, the preset pixel width may be three pixel widths, which, for example, may be three rows of pixels or three columns of pixels closest to a boundary of the expansion region in the original image.

In step 502, a mean square error of the pixel values of the edge region and a grayscale value of the edge region are determined according to the edge image information.

In step 503, it is judged whether the mean square error of the pixel values is less than or equal to a preset mean square error threshold. Based on a judgment result that the mean square error of the pixel values is less than or equal to the preset mean square error threshold, step 505 is performed. Based on a judgment result that the mean square error of the pixel values is greater than the preset mean square error threshold, step 504 is performed.

It is to be noted that the judgment of the grayscale value may be performed first and then the judgment of the mean square error of the pixel values is performed. The specific sequence is not limited.

In step 504, it is judged whether the grayscale value is greater than or equal to a preset grayscale value. Based on a judgment result that the grayscale value is greater than or equal to the preset grayscale value, step 505 is performed. Based on a judgment result that the grayscale value is less than the preset grayscale value, step 506 is performed.

For example, in the case where the mean square error of the pixel values is less than or equal to the preset mean square error threshold and where the grayscale value is greater than or equal to the preset grayscale value, step 505 is performed. In the case where the mean square error of the pixel values is greater than the preset mean square error threshold and where the grayscale value is less than the preset grayscale value, step 506 is performed.

In step 505, edge pixels are used for filling the expansion region to obtain a target image.

Illustratively, one row of pixels or one column of pixels closest to the boundary of the expansion region in the original image may be copied. For each pixel value, the expansion region is filled in columns or rows. After the expansion region is filled, a Gaussian filtering operation may also be performed on the expansion region.

Additionally, the filled expansion region here (the filled image may be referred to as an expansion image) may also be larger than a region actually needed to be expanded. In this case, the original image and the expansion image have an overlapping region. Weighted splicing is performed regarding the overlapping region, making the boundary transition more natural.

Illustratively, the edge pixels are used for filling the expansion region to obtain the target image.

The target image is generated according to the original image and the expansion image. Pixel weighted splicing is performed on the original image and the expansion image to generate the target image. For each pixel position in the overlapping region of the original image and the expansion image, the weight magnitude of a first pixel corresponding to each pixel position is negatively correlated with the distance of each pixel position relative to the original image, and the weight magnitude of a second pixel corresponding to each pixel position is positively correlated with the distance of each pixel position relative to the original image. The first pixel is derived from the original image. The second pixel is derived from the expansion image.

In step 506, an original sub-image is intercepted from the original image according to an expansion length corresponding to the expansion direction.

For example, if the length of the boundary parallel to the expansion direction is less than the length of the boundary perpendicular to the expansion direction and is greater than or equal to the second preset ratio value of the length of the boundary perpendicular to the expansion direction, the interception step may also be omitted. That is, the original image is directly taken as the original sub-image for subsequent operations. Additionally, this step may also be performed before step 502 to serve as the part of image pre-processing.

In step 507, a mask image is generated according to the original sub-image.

The size of the mask image is greater than the size of the original sub-image.

In step 508, image style recognition is performed on the original image to obtain a target image style, and preset correspondences is queried according to the target image style to obtain a target image generation network.

The target image generation network is obtained by training a preset network model. The preset network model is implemented based on Generative Adversarial Networks.

In step 509, the original sub-image and the mask image are input into the target image generation network to obtain a generated image output by the target image generation network.

In step 510, the expansion image is intercepted from the generation image, and the target image is generated according to the original image and the expansion image.

Figure 6:
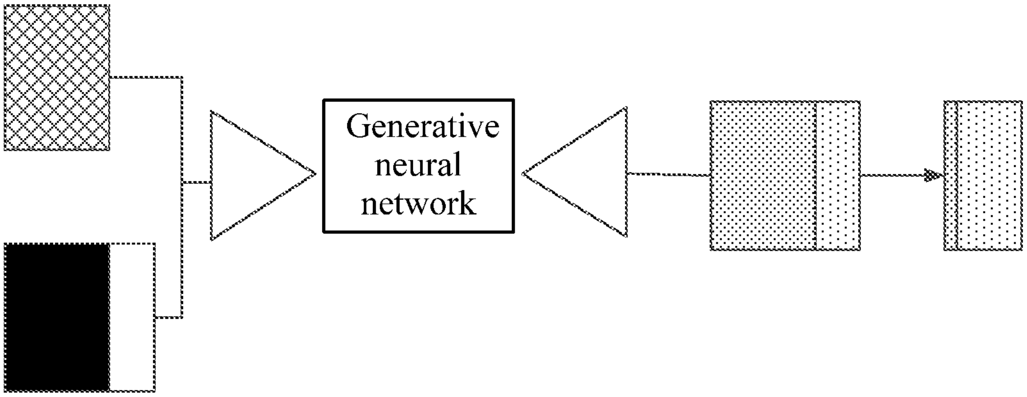
FIG. 6 is a diagram illustrating an image processing process based on Generative Adversarial Networks.

FIG. 6 is a diagram illustrating an image processing process based on Generative Adversarial Networks. As shown in FIG. 6, the original sub-image and the mask image are input from the leftmost side, with the original sub-image at the top and the mask image at the bottom. Through the processing of the Generative Adversarial Networks, the size of the output generation image matches the size of the mask image. Cutting is performed on the basis of the generation image as needed to obtain the expansion image.

For the image processing method according to this embodiment of the present disclosure, the mean square error of the pixel values of the edge region and the grayscale value of the edge region are determined according to the edge image information. Then the suitable target expansion mode is selected according to the mean square error and the grayscale value. The edge pixels are copied for filling so as to process an original image with a relatively simple edge image. The Generative Adversarial Networks are used for processing an original image with a relatively complex edge image. Before the Generative Adversarial Networks are used, the image style recognition may be performed to select a model whose style is more suitable. By using the advantages of different processing modes, original images with different edge image complexities can have a better expansion result.

In some embodiments, in response to determining that a plurality of expansion directions are provided, the method further includes the following steps: Each expansion ratio corresponding to each of the expansion directions is acquired, where an expansion ratio includes a ratio of an expansion length corresponding to an expansion direction to a side length of the original image corresponding to the expansion direction; and current expansion directions are determined sequentially according to expansion ratios in ascending order, where from a second expansion direction, an original image corresponding to a current expansion direction is a target image corresponding to a previous expansion direction. The sequential expansion mode guarantees that the expansion each time can refer to more original image information, enabling the expansion part to be more coordinated with the original image.

Figure 7:
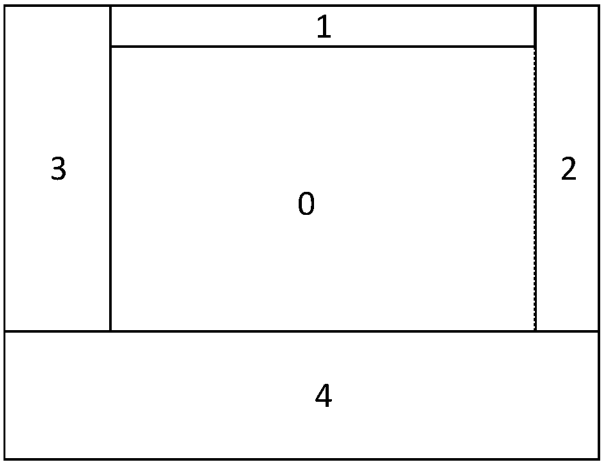
FIG. 7 is a diagram illustrating an expansion sequence according to an embodiment of the present disclosure.

FIG. 7 is a diagram illustrating an expansion sequence according to an embodiment of the present disclosure. As shown in FIG. 7, it is assumed that 0 denotes an initial original image. An expansion length in an upward expansion direction is the height in FIG. 1. An expansion length in a downward expansion direction is the height in FIG. 4. An expansion length in a leftward expansion direction is the height in FIG. 3. An expansion length in a rightward expansion direction is the height in FIG. 2. An upward expansion ratio is a ratio k1 of the height of 1 to the height of 0. A downward expansion ratio is a ratio k4 of the height of 4 to the height of 0. A leftward expansion ratio is a ratio k3 of the height of 3 to the height of 0. A rightward expansion ratio is a ratio k2 of the height of 2 to the height of 0. It is assumed that $k1<k2<k3<k4$. Then the sequence of the expansion directions is upward, rightward, leftward and downward. The expansion is performed according to this sequence. 1 is expanded on the basis of 0. That is, when the original image is processed by using a target expansion mode, the original image corresponding to the upward expansion direction is 0, and an obtained target image is an image after 0 is spliced with 1. 2 is expanded on the basis of 0 and 1. That is, when the original image is processed by using the target expansion mode, the original image corresponding to the rightward expansion direction is the image after 0 is spliced with 1. The rest can be done in the same way. 3 is expanded on the basis of 0, 1, and 2. 4 is expanded on the basis of 0, 1, 2, and 3.

It is to be noted that for a rectangular original image, if two expansion directions are on the same straight line, for example, a horizontally leftward direction and a horizontally rightward direction in width, the expansion sequence does not need to be determined because edges of the referred original image are generally uncorrelated.

Figure 8:
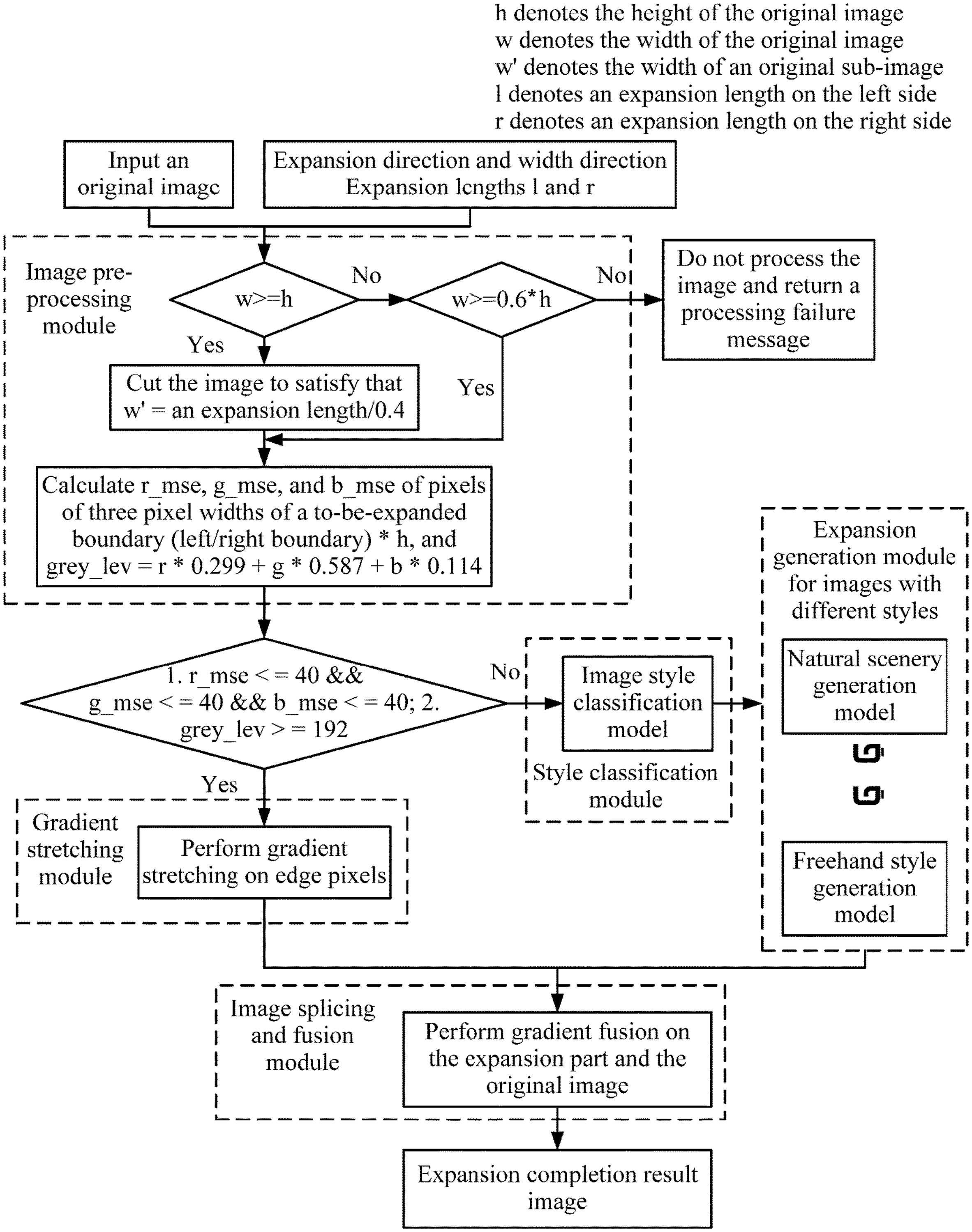
FIG. 8 is a flowchart illustrating image expansion processing according to an embodiment of the present disclosure.

An example of a left-and-right expansion in width is used for further description hereinafter. The sequence of the left-and-right expansion may not be limited. FIG. 8 is a flowchart illustrating image expansion processing according to an embodiment of the present disclosure. As shown in FIG. 8, an original image and a direction to be expanded are input to an image pre-processing module. The direction to be expanded is a width direction. Expansion ranges in the two expansion directions are also input to serve as expansion lengths. An expansion length may be limited. For example, the expansion length<=0.4*min (w, h). The image pre-processing module first judges whether the original image meets basic expansion conditions. When the basic expansion conditions are met and cutting is needed, the image pre-processing module performs cutting for an original sub-image and then calculates an indicator used for measuring the content complexity of an edge image. When the image content is relatively simple, a gradient stretching module performs processing to obtain an expansion image. When the image content is relatively complex, a style classification module performs style classification first, and then an image expansion generation model with a matching style is selected to generate an expansion image. Finally, an image splicing and fusion module performs a gradient fusion on the expansion part (that is, the expansion image) and the original image. At last, an expansion completion result image, that is, a target image, is output.

Figure 9:
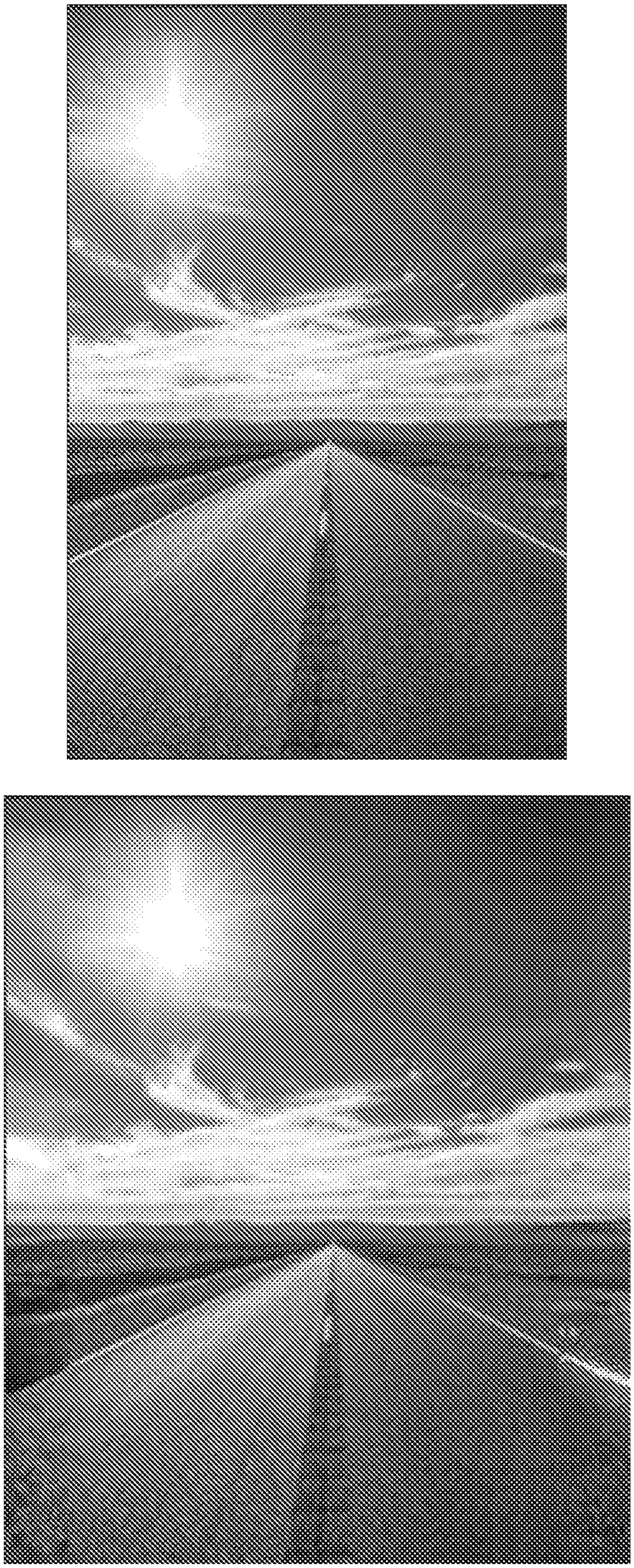
FIG. 9 is a diagram illustrating an image processing comparison according to an embodiment of the present disclosure.

FIG. 9 is a diagram illustrating an image processing comparison according to an embodiment of the present disclosure. In FIG. 9, an image above is an original image, and an image below is a target image. It can be seen from the original image that edge images in left and right directions are relatively complex and may be expanded by using a second mode. During the expansion, a target generation network corresponding to a natural scenery style may be selected so as to obtain a relatively sound expansion effect.

Figure 10:
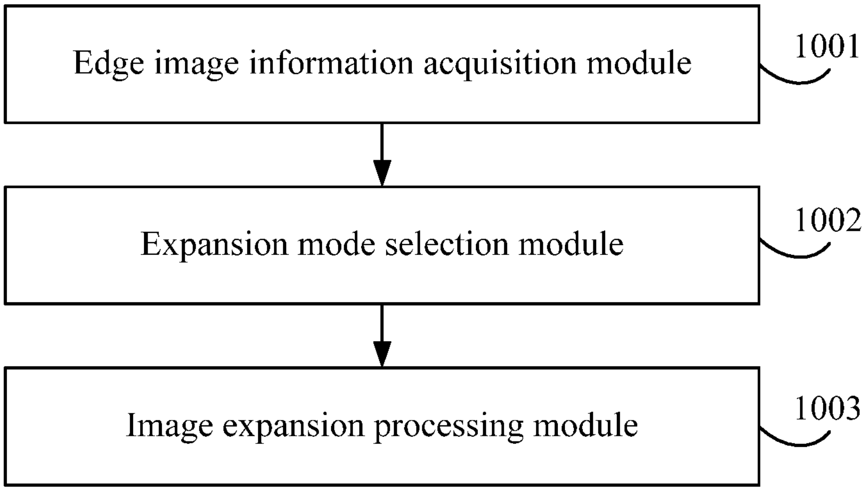
FIG. 10 is a block diagram of an image processing apparatus according to an embodiment of the present disclosure.

FIG. 10 is a block diagram of an image processing apparatus according to embodiment four of the present disclosure. The apparatus may be implemented by software and/or hardware, and may generally be integrated into a computer device. The apparatus may perform image processing by performing an image processing method. As shown in FIG. 10, the apparatus includes an edge image information acquisition module 1001, an expansion mode selection module 1002, and an image expansion processing module 1003.

The edge image information acquisition module 1001 is configured to acquire edge image information in an expansion direction of an original image.

The expansion mode selection module 1002 is configured to select a target expansion mode from at least two candidate expansion modes according to the edge image information.

The image expansion processing module 1003 is configured to process the original image by using the target expansion mode to obtain a target image.

For the image processing apparatus according to this embodiment of the present disclosure, the edge image information in the expansion direction of the original image is acquired; the target expansion mode is selected from the at least two candidate expansion modes according to the edge image information; and the original image is processed by using the target expansion mode to obtain the target image. Through the preceding technical solution, for the original image to be expanded, a more suitable expansion mode may be selected flexibly according to the edge image information in the expansion direction. Compared with the rigid adoption of a single expansion mode, more pertinent expansion processing can be implemented, and the expanded target image with a better expansion effect can be obtained.

For example, the at least two candidate expansion modes include a first mode and a second mode. The first mode is implemented by copying edge pixels. The second mode is implemented based on a neural network model.

The step in which the target expansion mode is selected from the at least two candidate expansion modes according to the edge image information includes the steps below.

A complexity of the image content of an edge region is determined according to the edge image information.

In response to determining that the complexity is less than or equal to a first preset complexity, the first mode is determined as the target expansion mode.

In response to determining that the complexity is greater than a second preset complexity, the second mode is determined as the target expansion mode. The second preset complexity is greater than or equal to the first preset complexity.

For example, the complexity is measured by using a first indicator and a second indicator. The first indicator includes a mean square error of pixel values of the edge region. The greater the mean square error, the greater the corresponding complexity. The second indicator includes a grayscale value of the edge region. The greater the grayscale value, the less the corresponding complexity.

For example, the step in which in response to determining that the target expansion mode includes the second mode, the original image is processed by using the target expansion mode includes the steps below.

An original sub-image is intercepted from the original image according to an expansion length corresponding to the expansion direction.

A mask image is generated according to the original sub-image. The size of the mask image is greater than the size of the original sub-image.

The original sub-image and the mask image are input into a target image generation network to obtain a generated image output by the target image generation network.

An expansion image is intercepted from the generation image, and the target image is generated according to the original image and the expansion image.

For example, the apparatus further includes a style recognition module and a target image generation network acquisition module.

The style recognition module is configured to, before the original sub-image and the mask image are input into the target image generation network, perform image style recognition on the original image to obtain a target image style.

The target image generation network acquisition module is configured to query preset correspondences according to the target image style to obtain the target image generation network. The preset correspondences include correspondences between different image styles and image generation networks.

For example, the target image generation network is obtained by training a preset network model. The preset network model is implemented based on Generative Adversarial Networks. A training process of the preset network model involves a plurality of training stages. Types of loss functions corresponding to each training stage increase sequentially from a first training stage to a last training stage.

For example, the first training stage includes a reconstruction loss function. A second training stage includes the reconstruction loss function, an adversarial loss function, and a perceptual loss function. A third training stage includes the reconstruction loss function, the adversarial loss function, the perceptual loss function, and a structure similarity loss function.

For example, the step in which the target image is generated according to the original image and the expansion image includes the step below.

Pixel weighted splicing is performed on the original image and the expansion image to generate the target image. For each pixel position in an overlapping region of the original image and the expansion image, the weight magnitude of a first pixel corresponding to each pixel position is negatively correlated with the distance of each pixel position relative to the original image, and the weight magnitude of a second pixel corresponding to each pixel position is positively correlated with the distance of each pixel position relative to the original image. The first pixel is derived from the original image. The second pixel is derived from the expansion image.

For example, the apparatus further includes an expansion ratio acquisition module and a current expansion direction determination module.

The expansion ratio acquisition module is configured to, in response to determining that a plurality of expansion directions are provided, acquire each expansion ratio corresponding to each of the expansion directions. An expansion ratio includes a ratio of an expansion length corresponding to an expansion direction to a side length of the original image corresponding to the expansion direction.

The current expansion direction determination module is configured to determine current expansion directions sequentially according to expansion ratios in ascending order. From a second expansion direction, when the original image is processed by using the target expansion mode, an original image corresponding to a current expansion direction is a target image corresponding to a previous expansion direction.

Figure 11:
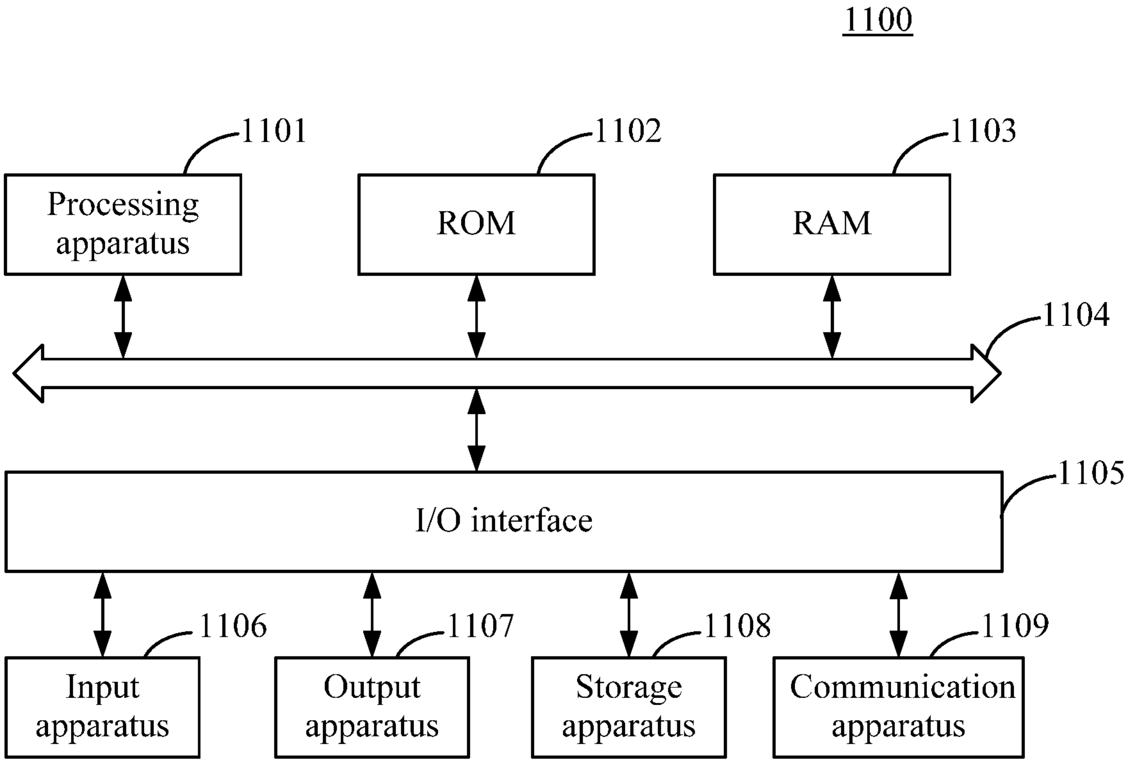
FIG. 11 is a structural diagram of a computer device according to an embodiment of the present disclosure.

Referring to FIG. 11, FIG. 11 shows a structural diagram of a computer device 1100 that can implement an embodiment of the present disclosure. The computer device of this embodiment of the present disclosure may include, but is not limited to, a mobile terminal or a fixed terminal. The mobile terminal may be, for example, a mobile phone, a laptop, a digital radio receiver, a personal digital assistant (PDA), a tablet computer, a portable media player (PMP) or a vehicle-mounted terminal (such as a vehicle-mounted navigation terminal). The fixed terminal may be, for example, a digital television (DTV) or a desktop computer. The computer device shown in FIG. 11 is merely an example and should not impose any limitation to the function and usage scope of the embodiments of the present disclosure.

As shown in FIG. 11, the computer device 1100 may include a processing apparatus 1101 (such as a central processing unit or a graphics processing unit). The processing apparatus 1101 may perform various types of appropriate operations and processing according to a program stored in a read-only memory (ROM) 1102 or a program loaded from a storage apparatus 1108 to a random-access memory (RAM) 1003. The RAM 1103 also stores various programs and data required for the operation of the computer device 1100. The processing apparatus 1101, the ROM 1102, and the RAM 1103 are connected to each other through a bus 1104. An input/output (I/O) interface 1105 is also connected to the bus 1104.

Generally, the following apparatuses may be connected to the I/O interface 1105: an input apparatus 1106 such as a touch screen, a touchpad, a keyboard, a mouse, a camera, a microphone, an accelerometer, and a gyroscope; an output apparatus 1107 such as a liquid crystal display (LCD), a speaker, and a vibrator; the storage apparatus 1108 such as a magnetic tape and a hard disk; and a communication apparatus 1109. The communication apparatus 1109 may allow the computer device 1100 to perform wireless or wired communication with other devices to exchange data. Although FIG. 11 illustrates the computer device 1100 having various apparatuses, it is to be understood that not all of the illustrated apparatuses need to be implemented or present. Alternatively, more or fewer apparatuses may be implemented.

Particularly, according to embodiments of the present disclosure, the processes described above with reference to the flowcharts may be implemented as computer software programs. For example, an embodiment of the present disclosure includes a computer program product. The computer program product includes a computer program carried on a non-transitory computer-readable medium. The computer program includes program codes for performing the methods illustrated in the flowcharts. In such an embodiment, the computer program may be downloaded and installed from a network via the communication apparatus 1109, or may be installed from the storage apparatus 1108, or may be installed from the ROM 1102. When the computer program is executed by the processing apparatus 1101, the preceding functions defined in the method according to embodiments of the present disclosure are implemented.

It is to be noted that the preceding computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or in conjunction with an instruction execution system, apparatus, or device. In the present disclosure, the computer-readable signal medium may include a data signal propagated in the baseband or as part of a carrier wave, where computer-readable program codes are carried in the data signal. The data signal propagated in this manner may be in various forms, including, but not limited to, an electromagnetic signal, an optical signal, or any appropriate combination thereof. The computer-readable signal medium may also be any computer-readable medium other than the computer-readable storage medium. The computer-readable signal medium may send, propagate or transmit a program used by or in conjunction with an instruction execution system, apparatus, or device. The program codes included on the computer-readable medium may be transmitted via any appropriate medium including, but not limited to, an electrical wire, an optical cable, a radio frequency (RF), or any appropriate combination thereof.

The preceding computer-readable medium may be included in the preceding computer device or may exist alone without being assembled into the computer device.

The preceding computer-readable medium carries one or more programs which, when executed by the computer device, cause the computer device to: acquire edge image information in an expansion direction of an original image, select a target expansion mode from at least two candidate expansion modes according to the edge image information, and process the original image by using the target expansion mode to obtain a target image.

Computer program codes for performing the operations in the present disclosure may be written in one or more programming languages or a combination thereof. The preceding one or more programming languages include, but are not limited to, object-oriented programming languages such as Java, Smalltalk, and C++, as well as conventional procedural programming languages such as C or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings illustrate possible architectures, functions, and operations of the system, method, and computer program product according to embodiments of the present disclosure. In this regard, each block in the flowcharts or block diagrams may represent a module, a program segment, or part of codes. The module, program segment, or part of codes contains one or more executable instructions for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The described modules involved in embodiments of the present disclosure may be implemented by software or hardware. The names of the modules do not constitute a limitation on the modules themselves. For example, an edge image information acquisition module may also be described as "a module for acquiring edge image information in an expansion direction of an original image".

The functions described herein may be performed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD), and the like.

In the context of the present disclosure, a machine-readable medium may be a tangible medium that may include or store a program used by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination thereof. More specific examples of the machine-readable storage medium may include an electrical connection with one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof.

According to one or more embodiments of the present disclosure, an image processing method is provided. The method includes the steps below.

Edge image information in an expansion direction of an original image is acquired.

A target expansion mode is selected from at least two candidate expansion modes according to the edge image information.

The original image is processed by using the target expansion mode to obtain a target image.

For example, the at least two candidate expansion modes include a first mode and a second mode. The first mode is implemented by copying edge pixels. The second mode is implemented based on a neural network model.

The step in which the target expansion mode is selected from the at least two candidate expansion modes according to the edge image information includes the steps below.

A complexity of the image content of an edge region is determined according to the edge image information.

In response to determining that the complexity is less than or equal to a first preset complexity, the first mode is determined as the target expansion mode.

In response to determining that the complexity is greater than a second preset complexity, the second mode is determined as the target expansion mode. The second preset complexity is greater than or equal to the first preset complexity.

For example, the complexity is measured by using a first indicator and a second indicator. The first indicator includes a mean square error of pixel values of the edge region. The greater the mean square error, the greater the corresponding complexity. The second indicator includes a grayscale value of the edge region. The greater the grayscale value, the less the corresponding complexity.

For example, the step in which in response to determining that the target expansion mode includes the second mode, the original image is processed by using the target expansion mode includes the steps below.

An original sub-image is intercepted from the original image according to an expansion length corresponding to the expansion direction.

A mask image is generated according to the original sub-image. The size of the mask image is greater than the size of the original sub-image.

The original sub-image and the mask image are input into a target image generation network to obtain a generated image output by the target image generation network.

An expansion image is intercepted from the generation image, and the target image is generated according to the original image and the expansion image.

For example, before the original sub-image and the mask image are input into the target image generation network, the method further includes the steps below.

Image style recognition is performed on the original image to obtain a target image style.

Preset correspondences is queried according to the target image style to obtain the target image generation network. The preset correspondences include correspondences between different image styles and image generation networks.

For example, the target image generation network is obtained by training a preset network model. The preset network model is implemented based on Generative Adversarial Networks. A training process of the preset network model involves a plurality of training stages. Types of loss functions corresponding to each training stage increase sequentially from a first training stage to a last training stage.

For example, the first training stage includes a reconstruction loss function. A second training stage includes the reconstruction loss function, an adversarial loss function, and a perceptual loss function. A third training stage includes the reconstruction loss function, the adversarial loss function, the perceptual loss function, and a structure similarity loss function.

For example, the step in which the target image is generated according to the original image and the expansion image includes the step below.

Pixel weighted splicing is performed on the original image and the expansion image to generate the target image. An overlapping region of the original image and the expansion image includes a plurality of pixel positions. The weight magnitude of a first pixel corresponding to each pixel position is negatively correlated with the distance of each pixel position relative to the original image. The weight magnitude of a second pixel corresponding to each pixel position is positively correlated with the distance of each pixel position relative to the original image. The first pixel is derived from the original image. The second pixel is derived from the expansion image.

For example, in response to determining that a plurality of expansion directions are provided, the method further includes the steps below.

Each expansion ratio corresponding to each of the expansion directions is acquired. An expansion ratio includes a ratio of an expansion length corresponding to an expansion direction to a side length of the original image corresponding to the expansion direction.

Current expansion directions are determined sequentially according to expansion ratios in ascending order. From a second expansion direction, when the original image is processed by using the target expansion mode, an original image corresponding to a current expansion direction is a target image corresponding to a previous expansion direction.

According to one or more embodiments of the present disclosure, an image processing apparatus is provided. The apparatus includes an edge image information acquisition module, an expansion mode selection module, and an image expansion processing module.

The edge image information acquisition module is configured to acquire edge image information in an expansion direction of an original image.

The expansion mode selection module is configured to select a target expansion mode from at least two candidate expansion modes according to the edge image information.

The image expansion processing module is configured to process the original image by using the target expansion mode to obtain a target image.

Additionally, although operations are illustrated in a particular order, it should not be construed as that the operations are required to be performed in the particular order shown or in a sequential order. In certain circumstances, multitasking and parallel processing may be advantageous. Similarly, although several specific implementation details are included in the preceding discussion, these should not be construed as limitations on the scope of the present disclosure. Certain features described in the context of separate embodiments may also be implemented in combination in a single embodiment. Rather, features described in the context of a single embodiment may also be implemented in multiple embodiments separately or in any appropriate subcombination.

What is claimed is:

1. An image processing method, performed by an electronic device, comprising:

acquiring edge image information in an expansion direction of an original image;

selecting a target expansion mode from at least two candidate expansion modes according to the edge image information, wherein the at least two candidate expansion modes comprise a first mode and a second mode, the first mode is to implement expansion by copying edge pixels, and the second mode is to implement expansion based on a neural network model; and processing the original image by using the target expansion mode to obtain a target image;

wherein selecting the target expansion mode from the at least two candidate expansion modes according to the edge image information comprises:

determining a complexity of image content of an edge region according to the edge image information;

in response to determining that the complexity is less than or equal to a first preset complexity, determining the first mode as the target expansion mode; and in response to determining that the complexity is greater than a second preset complexity, determining the second mode as the target expansion mode, wherein the second preset complexity is greater than or equal to the first preset complexity.

2. The image processing method according to claim 1, wherein the complexity is measured by using a first indicator and a second indicator; the first indicator comprises a mean square error of pixel values of the edge region; wherein complexity corresponding to the mean square error is in direct proportion to the mean square error; the second indicator comprises a grayscale value of the edge region; and complexity corresponding to the grayscale value is inversely proportional to the grayscale value.

3. The image processing method according to claim 1, wherein in response to determining that the target expansion mode comprises the second mode, processing the original image by using the target expansion mode comprises:

intercepting an original sub-image from the original image according to an expansion length corresponding to the expansion direction;

generating a mask image according to the original sub-image, wherein a size of the mask image is greater than a size of the original sub-image;

inputting the original sub-image and the mask image into a target image generation network to obtain a generated image output by the target image generation network; and intercepting an expansion image from the generated image and generating the target image according to the original image and the expansion image.

4. The image processing method according to claim 3, wherein before inputting the original sub-image and the mask image into the target image generation network, the image processing method further comprises:

performing image style recognition on the original image to obtain a target image style; and querying preset correspondences according to the target image style to obtain the target image generation network, wherein the preset correspondences comprises correspondences between different image styles and image generation networks.

5. The image processing method according to claim 3, wherein the target image generation network is obtained by training a preset network model, the preset network model is implemented based on Generative Adversarial Networks, a training process of the preset network model involves a plurality of training stages, and types of loss functions corresponding to each of the plurality of training stages increase sequentially from a first training stage among the plurality of training stages to a last training stage among the plurality of training stages.

6. The image processing method according to claim 5, wherein the first training stage comprises a reconstruction loss function; a second training stage among the training stages comprises the reconstruction loss function, an adversarial loss function, and a perceptual loss function; and a third training stage among the training stages comprises the reconstruction loss function, the adversarial loss function, the perceptual loss function, and a structure similarity loss function.

7. The image processing method according to claim 3, wherein generating the target image according to the original image and the expansion image comprises:

performing pixel weighted splicing on the original image and the expansion image to generate the target image, wherein an overlapping region of the original image and the expansion image comprises a plurality of pixel positions, a weight magnitude of a first pixel corresponding to each pixel position among the plurality of pixel positions is negatively correlated with a distance of the each pixel position relative to the original image, a weight magnitude of a second pixel corresponding to the each pixel position is positively correlated with the distance of the each pixel position relative to the original image, the first pixel is derived from the original image, and the second pixel is derived from the expansion image.

8. The image processing method according to claim 1, wherein in response to determining that a plurality of expansion directions are provided, the image processing method further comprises:

acquiring each expansion ratio corresponding to each of the plurality of expansion directions, wherein an expansion ratio comprises a ratio of an expansion length corresponding to an expansion direction among the plurality of expansion directions to a side length of the original image corresponding to the expansion direction; and determining current expansion directions sequentially according to expansion ratios in ascending order, wherein from a second expansion direction among the plurality of expansion directions, when the original image is processed by using the target expansion mode, an original image corresponding to a current expansion direction among the plurality of expansion directions is a target image corresponding to a previous expansion direction among the plurality of expansion directions.

9. A non-transitory computer-readable storage medium for storing a computer program, wherein when the computer program is executed by a processor, the image processing method according to claim 1 is performed.

10. A computer device, comprising a memory, a processor, and a computer program stored in the memory and executable by the processor, wherein when executing the computer program, the processor performs the image processing method according to claim 1.

11. The image processing method according to claim 1, wherein the neural network model comprises at least one of: Generative Adversarial Networks (GAN), a Variational Auto-Encoder (VAE), a Transformer model, or a patch match.

* * * * *